US012632590B1

(12) United States Patent
Anderson et al.

(10) Patent No.: US 12,632,590 B1
(45) Date of Patent: May 19, 2026

(54) DIGITAL IDENTITY AND AGENT SYSTEM

(71) Applicants: James Anderson, Morris Plains, NJ
(US); Steven Chrust, Stamford, CT
(US)

(72) Inventors: James Anderson, Morris Plains, NJ
(US); Steven Chrust, Stamford, CT
(US)

( * ) Notice: Subject to any disclaimer, the term of this
patent is extended or adjusted under 35
U.S.C. 154(b) by 9 days.

(21) Appl. No.: 18/218,992

(22) Filed: Jul. 6, 2023

Related U.S. Application Data

(63) Continuation-in-part of application No. 17/519,634,
filed on Nov. 5, 2021, now Pat. No. 12,001,529.

(51) Int. Cl.
| | |
|---|---|
| *G06F 21/62* | (2013.01) |
| *G06F 16/93* | (2019.01) |
| *G06F 21/60* | (2013.01) |
| *G06Q 10/0631* | (2023.01) |

(52) U.S. Cl.
CPC .......... *G06F 21/6245* (2013.01); *G06F 16/93*
(2019.01); *G06F 21/602* (2013.01); *G06F*
*21/604* (2013.01); *G06Q 10/06311* (2013.01)

(58) Field of Classification Search
CPC .... G06F 21/6245; G06F 16/93; G06F 21/602;
G06F 21/604; G06Q 10/06311
See application file for complete search history.

(56) References Cited

U.S. PATENT DOCUMENTS

| | | | | |
|---|---|---|---|---|
| 7,680,819 | B1 * | 3/2010 | Mellmer | ............... H04L 63/104 |
| | | | | 713/182 |
| 9,721,239 | B1 * | 8/2017 | Ho | ......................... H04L 67/306 |

| | | | | |
|---|---|---|---|---|
| 10,511,447 | B1 * | 12/2019 | Lakk | ...................... H04L 9/3297 |
| 10,587,408 | B2 * | 3/2020 | Ooi | ......................... H04L 9/0894 |
| 10,616,324 | B1 * | 4/2020 | Kaddoura | ................. A61F 2/44 |
| 10,665,230 | B1 * | 5/2020 | Fregly | ..................... G06F 3/167 |
| 10,878,198 | B2 * | 12/2020 | Kumar | .................... G06F 40/30 |
| 10,957,329 | B1 * | 3/2021 | Liu | ...................... G06F 16/2365 |
| 11,107,141 | B1 * | 8/2021 | Nagarajappa | ...... G06Q 30/0617 |
| 11,115,224 | B1 * | 9/2021 | Scofield | ............... H04L 9/0825 |
| 11,128,463 | B1 * | 9/2021 | Thompson | ............. G16Y 40/10 |
| 11,586,415 | B1 * | 2/2023 | Schreier | ................ G06F 3/0482 |
| 11,621,846 | B2 * | 4/2023 | Stolbikov | ........... G06F 16/9027 |
| | | | | 713/168 |
| 11,748,189 | B1 * | 9/2023 | Mehta | ..................... H04L 63/20 |
| | | | | 714/15 |

(Continued)

*Primary Examiner* — Aravind K Moorthy
(74) *Attorney, Agent, or Firm* — Gugliotta & Gugliotta
LPA

(57) ABSTRACT

A system to create a digital identity for a personal digital
assistant is provided which can act on behalf of its user,
while ensuring security, privacy, and anonymity. The system
involves the use of AGI/ML, blockchain, SQL storage, and
immutability. The digital identity is intertwined with the
user's own digital identity and allows them to set and
remove permissions and preferences for their assistant to act
on their behalf. The assistant can act as an agent or guardian
and can perform tasks such as filing paperwork. By con-
structing Merkle trees and concatenating their root hashes,
the system can ensure the integrity of the data included in the
trees. The proposed system provides a unique solution for
users to interact with various digital platforms, applications,
and environments, represented by their personal digital
assistant, which can autonomously perform tasks based on
the user's preferences and attributes.

5 Claims, 6 Drawing Sheets

(56)  References Cited

U.S. PATENT DOCUMENTS

| | | | | |
|---|---|---|---|---|
| 11,935,168 B1* | 3/2024 | Akmal | G10L 15/26 | |
| 11,973,870 B1* | 4/2024 | Mehta | H04L 9/3231 | |
| 12,021,806 B1* | 6/2024 | Lebrecht | G10L 15/1822 | |
| 12,035,136 B1* | 7/2024 | Shahidzadeh | H04W 12/065 | |
| 12,067,107 B2* | 8/2024 | Keith, Jr. | G06N 20/00 | |
| 2008/0161017 A1* | 7/2008 | Tu | G06F 16/29 | |
| | | | | 455/456.3 |
| 2011/0055919 A1* | 3/2011 | Hamilton, II | G06F 21/10 | |
| | | | | 715/757 |
| 2012/0324005 A1* | 12/2012 | Nalawade | G06Q 50/01 | |
| | | | | 709/204 |
| 2013/0166492 A1* | 6/2013 | Tardelli | G06N 20/00 | |
| | | | | 706/52 |
| 2013/0332162 A1* | 12/2013 | Keen | G06F 16/00 | |
| | | | | 704/235 |
| 2014/0245376 A1* | 8/2014 | Hibbert | G06F 21/577 | |
| | | | | 726/1 |
| 2016/0342683 A1* | 11/2016 | Lim | G06F 16/3329 | |
| 2017/0289111 A1* | 10/2017 | Voell | H04L 9/14 | |
| 2017/0310546 A1* | 10/2017 | Nair | H04W 24/08 | |
| 2018/0067991 A1* | 3/2018 | Agarwal | G06F 16/2455 | |
| 2018/0083960 A1* | 3/2018 | Sbeiti | H04L 63/0853 | |
| 2018/0160005 A1* | 6/2018 | Kowaka | G06V 10/242 | |
| 2018/0183601 A1* | 6/2018 | Campagna | G06F 21/602 | |
| 2018/0183768 A1* | 6/2018 | Lobban | H04L 63/061 | |
| 2018/0219836 A1* | 8/2018 | Peterson | H04L 67/1097 | |
| 2018/0285839 A1* | 10/2018 | Yang | G06Q 20/40 | |
| 2018/0330459 A1* | 11/2018 | Elder | G06Q 20/3674 | |
| 2018/0332042 A1* | 11/2018 | Yu | H04L 67/02 | |
| 2018/0337799 A1* | 11/2018 | Levi | H04L 12/2816 | |
| 2018/0350350 A1* | 12/2018 | Robinson | G10L 15/063 | |
| 2019/0081800 A1* | 3/2019 | Uhr | H04L 63/0823 | |
| 2019/0095069 A1* | 3/2019 | Proctor | G06F 3/011 | |
| 2019/0104094 A1* | 4/2019 | Albrecht | G10L 15/26 | |
| 2019/0171845 A1* | 6/2019 | Dotan-Cohen | H04L 51/02 | |
| 2019/0205727 A1* | 7/2019 | Lin | G06F 18/217 | |
| 2019/0205898 A1* | 7/2019 | Greco | G06Q 20/389 | |
| 2019/0206411 A1* | 7/2019 | Li | H04L 12/282 | |
| 2019/0213528 A1* | 7/2019 | Gupta | G06Q 10/10 | |
| 2019/0220603 A1* | 7/2019 | Gopalakrishnan | G06F 21/64 | |
| 2019/0228386 A1* | 7/2019 | Onnainty | H04L 9/3239 | |
| 2019/0235887 A1* | 8/2019 | Hemaraj | G06F 3/167 | |
| 2019/0251960 A1* | 8/2019 | Maker | G10L 21/0316 | |
| 2019/0260573 A1* | 8/2019 | Goto | G06Q 10/0833 | |
| 2019/0279615 A1* | 9/2019 | Ben-Dor | H04L 41/0893 | |
| 2019/0294728 A1* | 9/2019 | Kohlmeier | G06F 16/93 | |
| 2019/0295542 A1* | 9/2019 | Huang | G06F 3/167 | |
| 2019/0347621 A1* | 11/2019 | White | G06N 7/01 | |
| 2019/0370492 A1* | 12/2019 | Falchuk | G06T 19/00 | |
| 2019/0378162 A1* | 12/2019 | Goldberg | G06Q 30/0242 | |
| 2020/0021438 A1* | 1/2020 | Gasparini | G06F 16/907 | |
| 2020/0050949 A1* | 2/2020 | Sundararaman | G06F 40/284 | |
| 2020/0168229 A1* | 5/2020 | Manchireddy | H04W 4/80 | |
| 2020/0236152 A1* | 7/2020 | Bradley | H04N 21/44227 | |
| 2020/0252508 A1* | 8/2020 | Gray | H04M 1/6041 | |
| 2020/0257853 A1* | 8/2020 | Hussain | G06F 40/216 | |
| 2020/0349284 A1* | 11/2020 | Saket | G06F 21/64 | |
| 2020/0374372 A1* | 11/2020 | Le Strat | H04L 67/567 | |
| 2020/0379977 A1* | 12/2020 | Saket | H04L 9/3218 | |
| 2020/0382301 A1* | 12/2020 | Saket | H04L 9/3228 | |
| 2021/0021426 A1* | 1/2021 | Scherrer | H04L 9/3218 | |
| 2021/0067321 A1* | 3/2021 | Lu | G06F 16/9027 | |
| 2021/0067633 A1* | 3/2021 | Kim | H04M 3/42025 | |
| 2021/0076206 A1* | 3/2021 | Gray | H04M 3/527 | |
| 2021/0109917 A1* | 4/2021 | Xiao | G06F 16/2255 | |
| 2021/0124645 A1* | 4/2021 | Chinthekindi | G06F 11/0793 | |
| 2021/0176229 A1* | 6/2021 | Xuan | H04L 63/0853 | |
| 2021/0209590 A1* | 7/2021 | Han | G06Q 20/3827 | |
| 2021/0211487 A1* | 7/2021 | Lee | H04L 67/06 | |
| 2021/0218742 A1* | 7/2021 | Cook | G06F 21/31 | |
| 2021/0266725 A1* | 8/2021 | Gray | H04L 41/046 | |
| 2021/0281421 A1* | 9/2021 | Semenovskiy | G06Q 20/3276 | |
| 2021/0312929 A1* | 10/2021 | Del Sordo | G06F 3/167 | |
| 2021/0314167 A1* | 10/2021 | Liao | H04L 9/3247 | |
| 2022/0006641 A1* | 1/2022 | Snow | H04L 9/0869 | |
| 2022/0100961 A1* | 3/2022 | Vishnoi | G06F 16/35 | |
| 2022/0138995 A1* | 5/2022 | Baughman | G06Q 30/0205 | |
| | | | | 345/619 |
| 2022/0141029 A1* | 5/2022 | Dahmen | H04L 9/3231 | |
| | | | | 713/176 |
| 2022/0172021 A1* | 6/2022 | Hoang | G06N 3/04 | |
| 2022/0200791 A1* | 6/2022 | Le Roux | H04L 9/0894 | |
| 2022/0238105 A1* | 7/2022 | Goldfarb | G06F 3/167 | |
| 2022/0329691 A1* | 10/2022 | Chinthakunta | H04M 3/42042 | |
| 2022/0353211 A1* | 11/2022 | White | H04L 51/02 | |
| 2022/0358344 A1* | 11/2022 | Tormasov | G06Q 50/01 | |
| 2022/0368525 A1* | 11/2022 | Robinson-Morgan | H04L 9/14 | |
| 2022/0393876 A1* | 12/2022 | Winarski | H04L 9/50 | |
| 2023/0016241 A1* | 1/2023 | Xiao | G06F 21/602 | |
| 2023/0026123 A1* | 1/2023 | Lim | G06T 9/00 | |
| 2023/0188481 A1* | 6/2023 | Sharifi | G10L 17/06 | |
| | | | | 709/204 |
| 2023/0208640 A1* | 6/2023 | El Khiyaoui | H04L 9/3247 | |
| | | | | 713/168 |
| 2023/0224153 A1* | 7/2023 | Avasarala | G06F 21/64 | |
| | | | | 713/193 |
| 2023/0247018 A1* | 8/2023 | Dutt | H04L 63/0861 | |
| | | | | 713/153 |
| 2023/0254302 A1* | 8/2023 | Ramezanpour | G06F 21/44 | |
| | | | | 713/156 |
| 2023/0299965 A1* | 9/2023 | Harrison | H04L 9/3263 | |
| | | | | 713/189 |
| 2023/0335138 A1* | 10/2023 | Nusbaum | G10L 17/22 | |
| 2023/0386469 A1* | 11/2023 | Horton | G06V 40/18 | |
| 2023/0394612 A1* | 12/2023 | Bleibtrey | G06Q 50/40 | |
| 2023/0401125 A1* | 12/2023 | Madan | G06F 11/1453 | |
| 2023/0419127 A1* | 12/2023 | Abobakr | G06F 40/30 | |
| 2024/0086729 A1* | 3/2024 | Baughman | G06N 5/022 | |
| 2024/0089090 A1* | 3/2024 | Li | H04L 9/3236 | |
| 2024/0106657 A1* | 3/2024 | Claesen | H04L 51/52 | |
| 2024/0134987 A1* | 4/2024 | Kaster | G06F 21/565 | |
| 2024/0144200 A1* | 5/2024 | Srivastava | G06Q 20/102 | |
| 2024/0176629 A1* | 5/2024 | Reddy | G06F 9/453 | |
| 2024/0184867 A1* | 6/2024 | Sharifi | H04L 63/0861 | |
| 2024/0189721 A1* | 6/2024 | Palamadai | G06F 21/60 | |
| 2024/0205017 A1* | 6/2024 | Thomson | H04L 9/3247 | |
| 2024/0214231 A1* | 6/2024 | Phillips | H04L 65/1093 | |
| 2024/0224001 A1* | 7/2024 | Ooi | H04W 4/08 | |
| 2024/0232772 A1* | 7/2024 | Mokashi | G06Q 10/0639 | |
| 2024/0291839 A1* | 8/2024 | Yagnik | H04L 51/214 | |
| 2024/0306011 A1* | 9/2024 | Zhang | H04L 41/147 | |
| 2024/0372947 A1* | 11/2024 | Balasubramanian | | |
| | | | H04M 3/5191 | |
| 2024/0414002 A1* | 12/2024 | Joshi | H04L 9/50 | |
| 2025/0061635 A1* | 2/2025 | Dave | G09B 21/00 | |

* cited by examiner

DIGITAL IDENTITY AND AGENT SYSTEM

RELATED APPLICATIONS

The present application is a Continuation of U.S. Ser. No. 17/519,634, filed on Nov. 5, 2021, which is a Continuation in Part of U.S. Pat. No. 11,593,415, both incorporated by reference as if fully rewritten herein.

BACKGROUND OF THE INVENTION

1. Field of the Invention

The present invention relates generally to a system and method for verifying and managing digital identities and, more particularly, to the creation of digital identities for digital agents and to methods for identifying these digital agents, along with their creators, to ensure accountability and transparency in the use of these technologies.

2. Description of the Related Art

Identity is pervasive, and digital identity, in particular, is taking a center stage in our society. As provided in the Related Applications, the determination, certification and/or validation of an entity's "identity" is provided in which a unique identity (typically, but not exclusively represented digitally) is created for each entity that is widely shared, accepted, and changes dynamically over time. The creation of both trust scores and confidence scores are associated with the entity's identity, with trust measuring the degree to which it is believed that the identity proffered by an entity is in fact correct, not faked, stolen, or otherwise confusable with the identity of some other entity (whether by design, fraud, or accident, i.e., identical name, photo of a twin, etc.), while confidence measures a level of certainty of the conclusion, given the inherent reliability of the measurements and investigations undertaken, and the skill, reputation and history learned through experience and testing of the organizations so undertaking.

However, with the highly active and fast-growing area of artificial generative intelligence (AGI), there is an unprecedented shift in large language models, machine learning (ML), artificial intelligence systems, artificial generative intelligence, creative systems, and solutions from everywhere. The abundance of these technologies create a potential for AGI, ML and the like to change how interactions are made with digital media in the future. Further, with the ability for entities to delegate agency to AGI agents, a need exists for accountability and transparency for these technologies as well as systems and methods to be implemented to ensure that these technologies are monitored.

Consequently, with the creation of AI/AGI/ML agents, a process is required to identify the human or juridic entity responsible for the instantiations of the autonomous agent (s).

SUMMARY OF THE INVENTION

It is thus an object of the present invention to provide a system and method for verifying and managing digital identities.

It is a feature of the present invention to create digital identities for digital agents and to methods for identifying these digital agents, along with their creators, to ensure accountability and transparency in the use of these technologies.

Briefly described according to a preferred embodiment, the present invention relates to a system for creating and managing digital identities and digital agents, and more particularly to a system that allows for the creation of a digital identity that can be linked to a digital agent to act on behalf of the individual. The system may use blockchain technology and Merkle trees to ensure the immutability and security of the digital identity and digital agent. The system may also allow for the setting and removal of permissions and preferences for digital agents to act on behalf of the individual. The systems for and methods of digital identity and identification of digital agents using artificial generative intelligence and machine learning provide a secure, private, and anonymous way to create and manage digital identities for digital agents. The system may use blockchain technology, digital certificates, and digital signatures to ensure accountability and transparency in the use of these technologies.

The present invention has applications in various fields, such as personal digital assistants, autonomous systems, and more.

An advantage of the present invention is the ability to act as an intelligent gateway to the validation, verification and trusted confidence values of an entity (an individual person or organization) for each type and level of identification needed. Utilizing a distributed network and a peer-to-peer blockchain system on a combination of distributed and centralized systems, rules and preferences of the type of validation, identity verification of digital generative agents may be implemented, checked and cross-checked concerning the identification of an entity.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
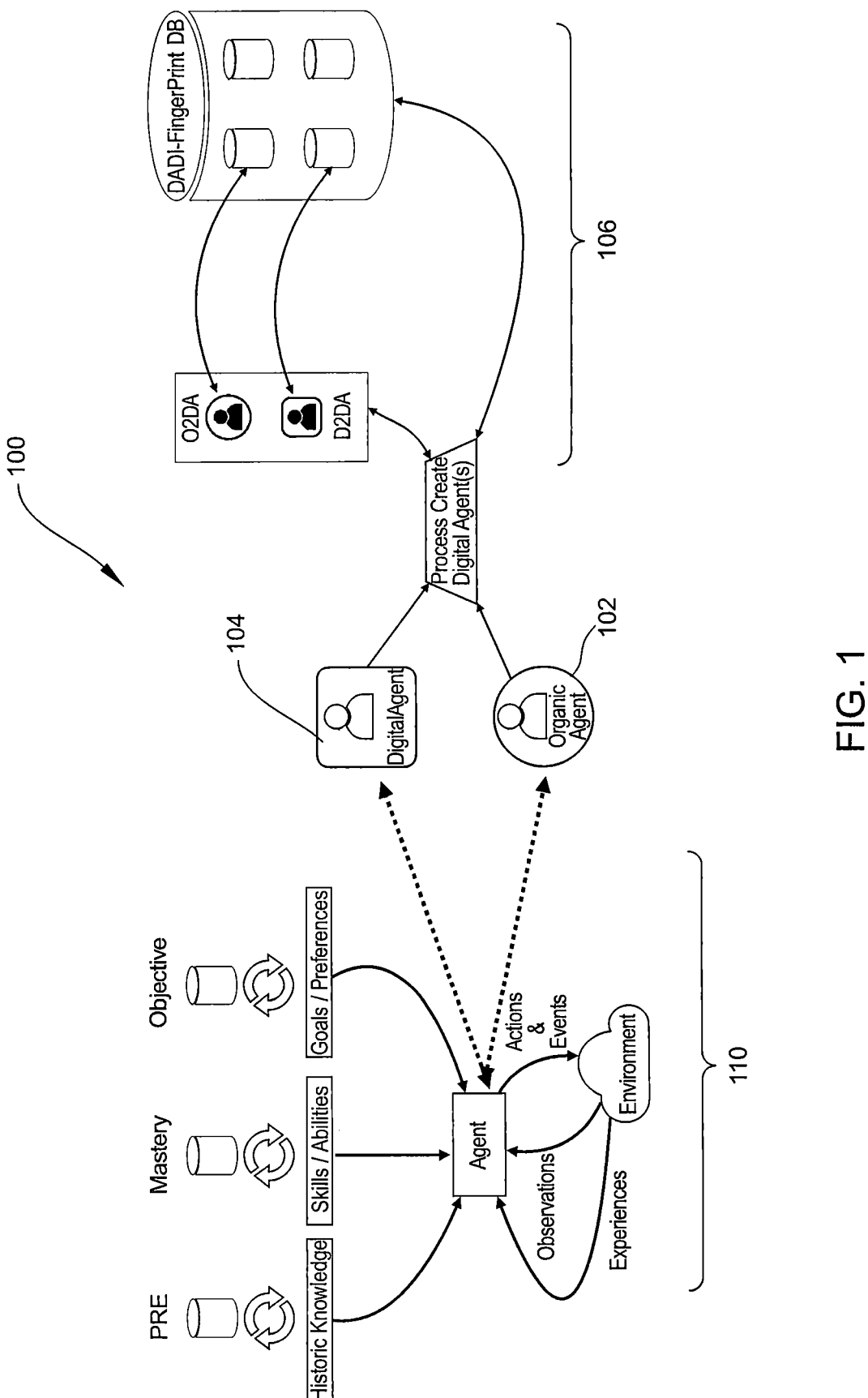
FIG. 1 is a schematic of a system for the creation and management of digital identities according to a preferred embodiment of the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

For purposes of the present invention, the term artificial intelligence (AI) refers to the ability of machines and computer systems to perform tasks that normally require human intelligence, such as learning, problem solving, decision-making, perception, natural language understanding, and more. AI systems may be programmed to analyze and interpret vast amounts of data, recognize patterns, and make predictions or recommendations based on that analysis. Some AI systems may also learn from experience and improve their performance over time through a process known as machine learning.

For purposes of the present invention, the term artificial generative intelligence (AGI) refers to a form of artificial intelligence that is capable of understanding or learning any intellectual task that a human being can. It is also known as "strong AI" or "full AI." AGI may be able to reason, plan, learn, and perceive its environment like a human being, and would be able to apply that knowledge to a wide range of tasks. In addition, AGI may have the ability to self-improve, meaning it could enhance its own intelligence and capabilities over time. AGI may utilize advanced machine learning algorithms, natural language processing, robotics, and other related fields.

For purposes of the present invention, the term artificial Machine Learning (ML) refers broadly to development of algorithms and statistical models that enable computer systems to learn and improve their performance at specific tasks based on input data. Instead of being explicitly programmed, machine learning systems may be designed to learn from data, identify patterns, and make predictions or decisions without human intervention. Machine learning techniques include supervised learning, unsupervised learning, semi-supervised learning, and reinforcement learning.

For purposes of the present invention the term agent should be broadly construed as a person or organization that has the ability to act on behalf of another person or group, typically with some level of autonomy or delegated authority. An agent may act in a representative capacity for business, employment or contractual purposes.

For purposes of the present invention the present invention, the term Digital Agent refers to a digital entity or program that is capable of performing tasks or making decisions on behalf of another entity, such as a user or organization and encompasses not only digital entities or programs, but also extends to robotics and organic agents. Digital Agents are and should be defined broadly to encompass capabilities of undertaking tasks or making decisions on behalf of users or organizations, wherein control over these agents may either be direct by the user or can possess a certain degree of autonomy based on their programming and data access capabilities. Digital agents, whether they are digital entities, robots, or organic agents, may have the ability to interact with other digital entities or systems, thereby facilitating task completion and decision-making processes. Users or organizations may assign specific permissions and preferences to these agents, empowering them to act on their behalf. Additionally, the present invention enables the creation and integration of digital identities for both users and their agents. Moreover, it allows for the amalgamation of root hashes from separate Merkle trees to validate the integrity of data contained within these trees. Overall, the invention enables users to have greater control over their digital presence and interactions, while maintaining privacy and security.

For purposes of the present invention, the term assistant refers to a person or software tool that helps or supports another person in performing tasks or achieving goals. An assistant may provide information, make recommendations, perform actions on behalf of the user, or simply provide guidance and support. In general, an assistant may be designed to make a person's life easier by taking on some of the burden of decision-making, organization, or execution. Some common examples of assistants include personal assistants, executive assistants, virtual assistants, digital assistants, and robotics (i.e., robots, chatbots, etc.). The role of an assistant can vary widely depending on the context, but the common thread is that they provide some form of assistance or support to the user.

For purpose of the present invention, the term digital assistant digital assistant is an artificial intelligence (AI) program or software agent that can perform various tasks and services for an individual or organization. Digital assistants may interpret natural language queries or commands and respond with useful information or take action on behalf of the user. Digital assistants may be integrated into various devices such as smartphones, smart speakers, and computers, and can be accessed through voice commands, typing, or touch. They can help with tasks such as setting reminders, making phone calls, sending messages, scheduling appointments, searching the internet, providing weather forecasts, and controlling smart home devices.

For purpose of the present invention, the term digital identity is information used by computer systems or others to represent an external agent, such as a person, organization, application or device. Digital identities allow access to services provided with computers to be automated and make it possible for computers to mediate relationships. The use of the term digital identity may be broadly construed to refer to an entire collection of information generated by a person's online activity.

For purposes of the present invention, the term "generative" or "generative model" refers to randomly generating observable data. Generative data may be observed via the generative approach or the discriminative approach.

For purposes of the present invention, the functional acts of a representative may broadly involve acting on behalf of a person or organization in various capacities. This can include communicating with others on behalf of the person or organization, making decisions or taking actions within a defined scope of authority, providing guidance or advice, and handling administrative tasks such as scheduling and record-keeping. Representatives may also be responsible for managing relationships with clients or customers, negotiating contracts, resolving disputes, and representing their organization in legal proceedings. In some cases, representatives may act as intermediaries between different parties, such as in the case of a union representative negotiating on behalf of workers with management. Overall, the functional acts of a representative are geared towards achieving the goals of the person or organization they are representing, while also ensuring that their actions are aligned with legal and ethical standards.

For purposes of the present invention, reference to a "bot" or "learning agent" is a computer program or software that is designed to perform automated tasks or interact with users through conversational interfaces, such as chatbots or voice assistants. These agents use various techniques such as natural language processing, machine learning, and artificial intelligence to understand and respond to user input, execute commands, and provide relevant information or services. Bots can be trained to learn from user interactions and feedback, allowing them to improve over time and provide more personalized and effective responses. They can be used in various domains, including customer service, e-commerce, healthcare, and education, to automate routine tasks, enhance user experiences, and increase efficiency.

For purposes of the present invention, reference to a "task" or "tasks" refers to a specific action, activity, or set of instructions that an agent, whether it is a digital agent, organic agent, or robotic agent, is assigned or required to perform. Tasks can vary in nature and complexity, and they can encompass a wide range of activities, such as data processing, decision-making, communication, problem-solving, or physical actions. For digital agents, tasks can be executed through digital processes, algorithms, or programs, leveraging their computational capabilities and access to data. These tasks can involve interactions with other digital entities or systems, retrieval and analysis of information, automation of processes, or the execution of predefined operations. Organic agents, being human individuals, may be assigned tasks that draw upon their cognitive abilities, skills, and knowledge. These tasks may involve intellectual analysis, critical thinking, creativity, interpersonal communication, or physical actions that require human dexterity and mobility. Robotic agents, as physical embodiments of agency, may be assigned tasks that combine both digital and physical elements. They can interact with their environment, manipulate objects, perform specific actions, and utilize sensors and actuators to fulfill their designated tasks.

For purposes of the present invention, the term "organic agent" refers to a human being who serves as the original entity in the context of agent-based systems. In this context, the organic agent is a living, biological individual with cognitive capabilities and decision-making abilities. The term emphasizes the human element as the initial source of agency. However, it is important to note that a digital agent, which is a digital entity or program, can also create and establish another digital agent. In this scenario, the digital agent assumes the role of the original agent, possessing the ability to process tasks and make decisions on behalf of the digital entity or program. This highlights the recursive nature of digital agents, where one agent can create and employ another agent to perform specific functions or tasks within the digital realm.

For purposes of the present invention, the benefits of having a digital proxy, digital X that can provide services and create the ability to act in a functional, legalized capacity.

For purposes of the present invention, "legal representation" refers to the ability of an artificial intelligence (AI) system to act as a representative for an Organic Agent user in legal matters. This may involve performing tasks such as drafting legal documents, providing legal advice, or representing the user in legal proceedings. The AI system may be programmed to use natural language processing or natural language understanding and machine learning algorithms interpret legal statutes, case law, and other legal materials in order to provide understanding, context, semantics and sentiment to provide guidance and recommendations to the user. The system may also be able to access and analyze data from legal databases and other sources to assist with legal research and analysis. Ultimately, the goal of an AI-based legal representative is to provide users with reliable and efficient legal services that are tailored to their specific needs and preferences.

For purposes of the present invention, NLP stands for Natural Language Processing (NLP) and Natural Language Understanding (NLU) are closely related but have slightly different meanings. NLP refers to the field of artificial intelligence (AI) that focuses on the interaction between computers and human language. It involves the development of algorithms and techniques that enable computers to understand, interpret, and generate human language in a way that is meaningful and useful. NLP encompasses a wide range of tasks, including but not limited to text parsing, text generation, machine translation, sentiment analysis, information extraction, and question answering. NLU, on the other hand, is a specific subfield of NLP that specifically deals with the comprehension and understanding of natural language by computers. It aims to enable machines to understand the meaning, context, and intent behind human language. NLU involves extracting semantic and syntactic information from text or speech, identifying entities, relationships, and sentiment, and deriving the underlying meaning and intent behind the language used.

In essence, NLP is a broader term that encompasses the entire field of processing human language by machines, while NLU is a more focused aspect within NLP that deals with the understanding of natural language. NLU plays a crucial role in various applications such as virtual assistants, chatbots, voice recognition systems, language translation, and sentiment analysis, among others.

For purposes of the present invention, "generative digital agents" (GDA) refer to artificial intelligence (AI) systems that have the ability to create and generate new content, such as text, images, or music, based on a set of rules, inputs, or training data. These agents may use deep learning algorithms and neural networks to learn patterns and relationships within the data and generate new outputs that are similar to the inputs but with unique variations. With the digital agent creating the said works of art, there was an organic agent that established the original digital agent and thus the credit for the future works that is created should be credited back to the organic agent as well. Generative digital agents may be trained on a wide range of datasets, from text and speech to images and videos, and can be used for various applications, such as content creation, design, and even scientific research.

For purposes of the present invention, "autonomous digital agents" (ADA) refers to software entities that can perform tasks or make decisions without human intervention or control. These agents have the ability to operate independently and interact with the environment, making decisions based on pre-programmed rules or learned behaviors. Autonomous digital agents can be used in a variety of applications, such as self-driving cars, smart home automation systems, and chatbots. They may also be designed to adapt to changing circumstances, learn from experience, and improve their performance over time. While they may not have true consciousness or free will, autonomous digital agents can exhibit a degree of intelligence and decision-making capabilities that can be useful in various fields by using natural language processing and natural language understanding to identify and analyze sentiment analysis, context, semantics and understanding.

For purpose of the present invention, the term "autonomous digital generative agent" refers not only to software programs but also includes physical forms such as robots. These agents possess the ability to operate independently in performing specific tasks or sets of tasks, utilizing artificial intelligence and machine learning algorithms. They leverage these technologies to generate new outputs or responses. These agents, whether in digital or physical form, may be capable of learning from their environment and making decisions autonomously, without relying on explicit human intervention. They may employ generative models to create novel data or content that is either similar to or derived from existing input data. Applications of these autonomous digital generative agents may extend beyond the digital environment and include robotics. They may be utilized for a wide range of tasks, such as natural language processing, image and video analysis, music and art generation, and more. The ability to implement these agents in physical forms, such as robots, may expands their potential impact by enabling them to interact with the physical world and perform actions in real-world settings.

As shown in conjunction with the Figures, in which like reference are assigned to like elements, the present invention provides a system for creating and managing digital identities and digital agents, generally noted as 100, is shown. Organic agents 102 or digital agents 104 may be authorized to on behalf of an individual in various contexts such as commerce, finance, and social media. The system 100 uses blockchain technology 106 and Merkle trees to ensure the immutability and security of the digital identity and digital agent. The system 100 may further incorporate a permission and preference setting module 110 that enables users 102 to define and modify preferences and permissions for digital agents 102 acting on their behalf. Users can specify the tasks, actions, or access rights that digital agents 104 are authorized to perform on their behalf. This module 110 provides users with control and flexibility in managing the behavior and capabilities of digital agents.

Figure 2:
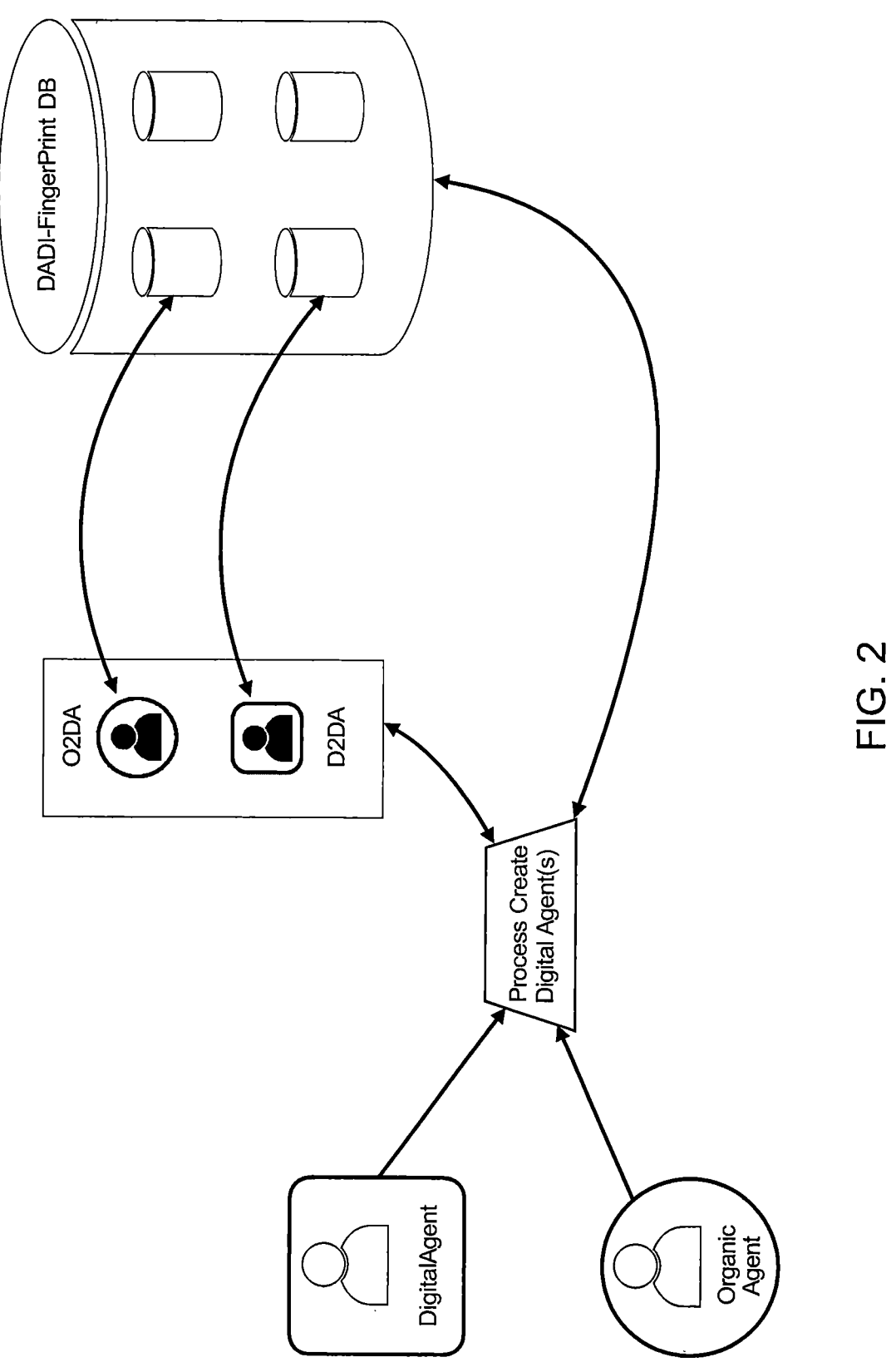
FIG. 2 is a schematic of validation of the created digital identities for use therewith.
Figure 3:
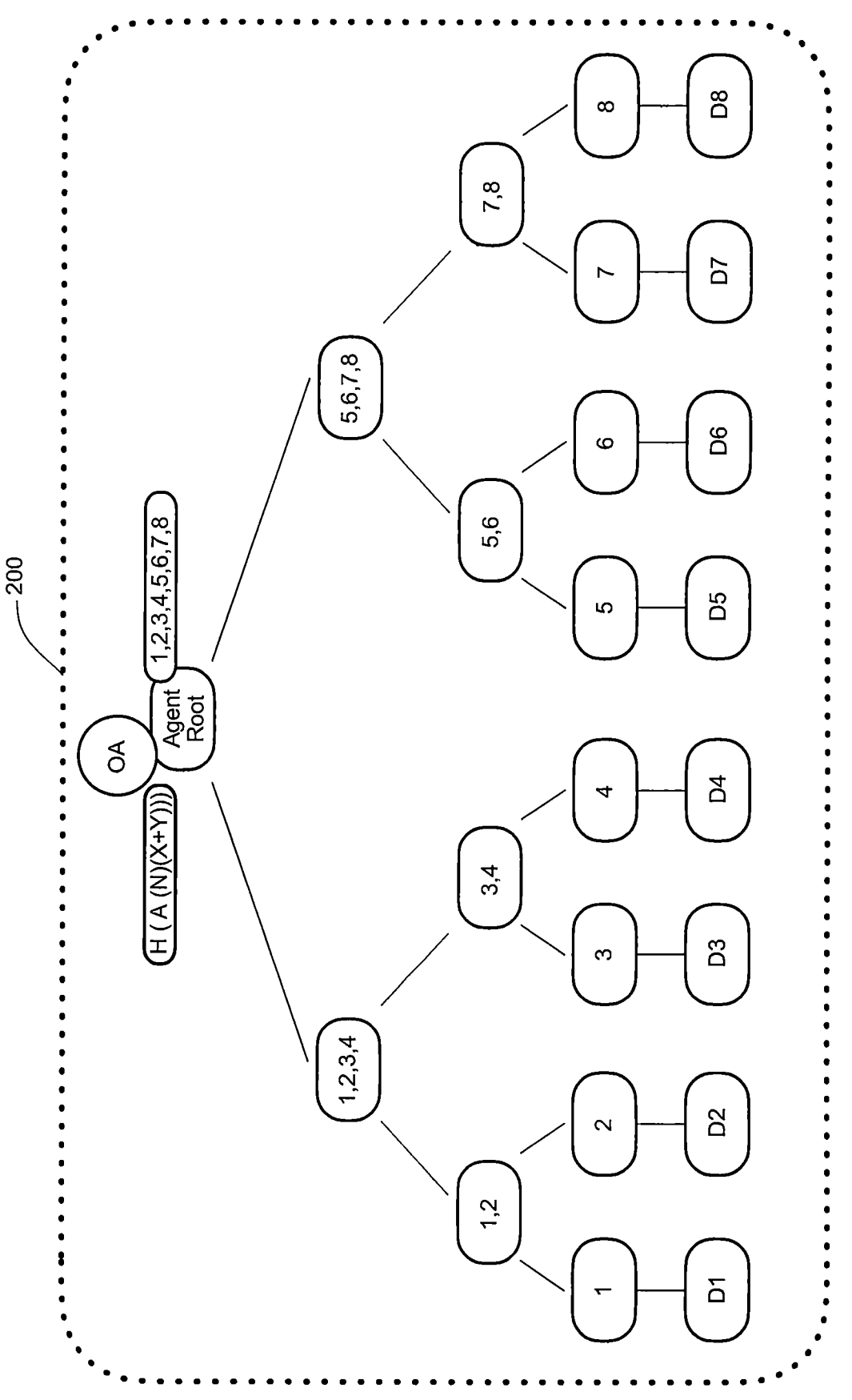
FIG. 3 is an exemplary Merkle tree representation of a method for creating a digital identity for use therewith.
Figure 4:
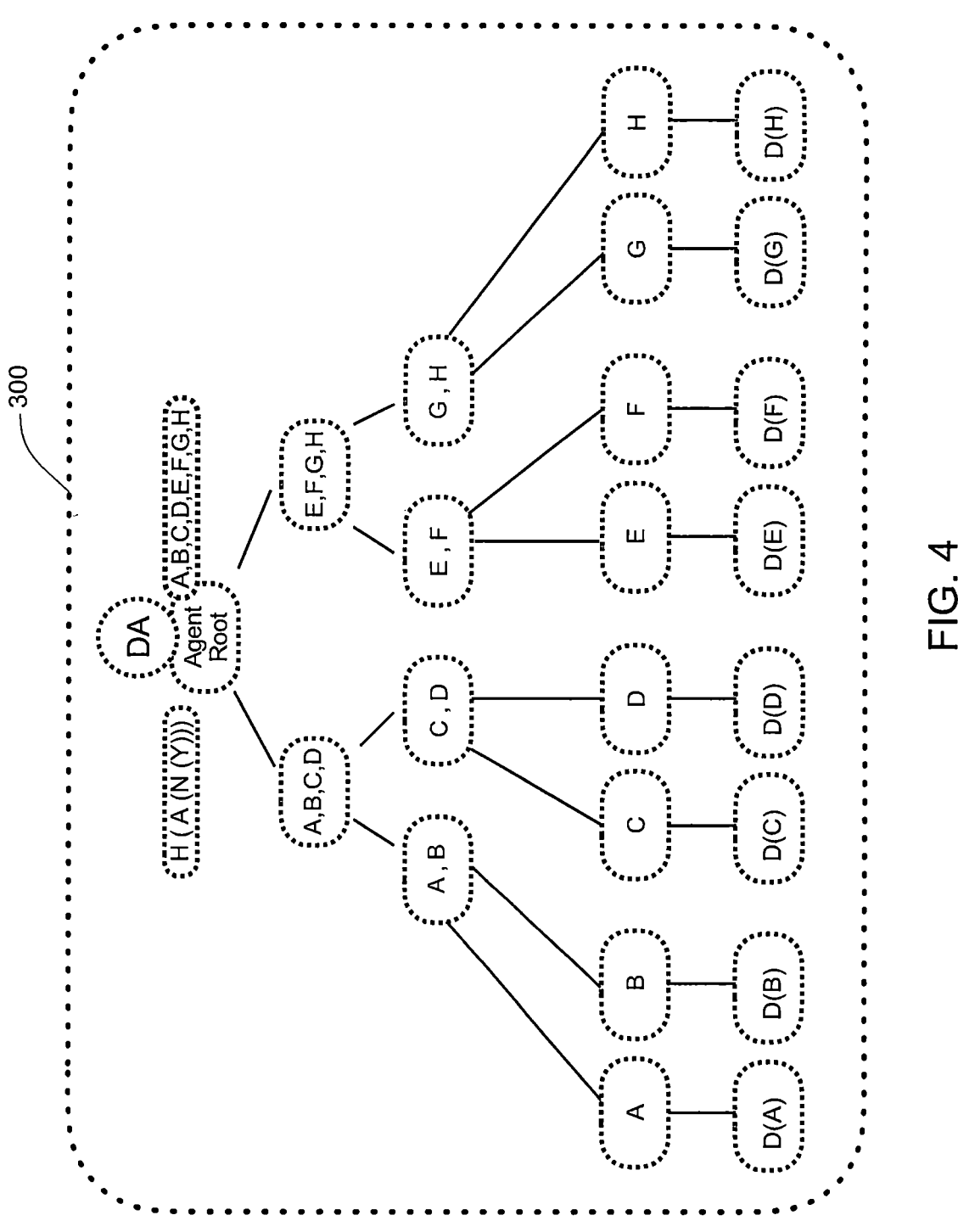
FIG. 4 and FIG. 5 are Merkle tree representations of a method for creating digital agent identities for use therewith.
Figure 5:
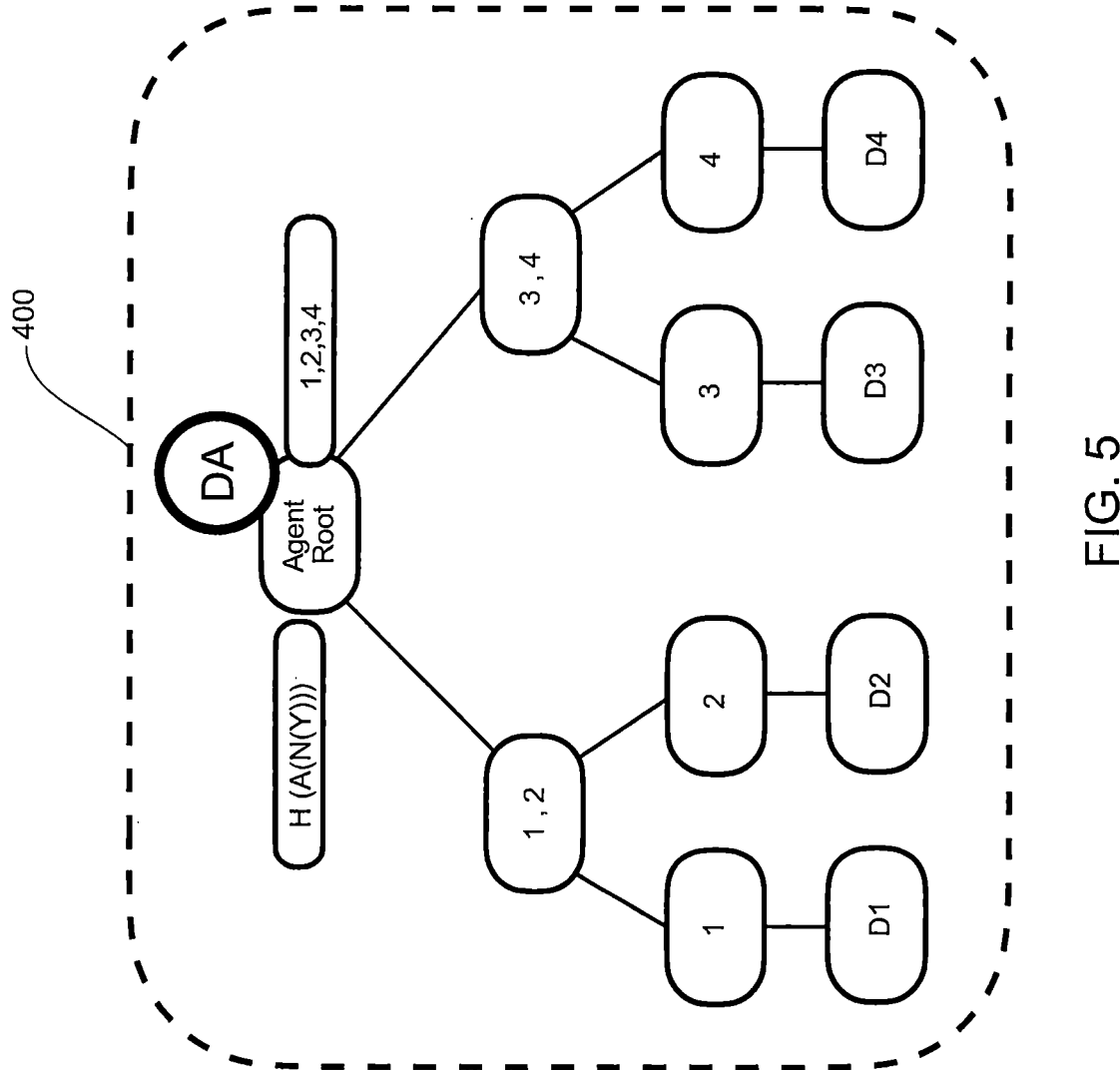
Figure 6:
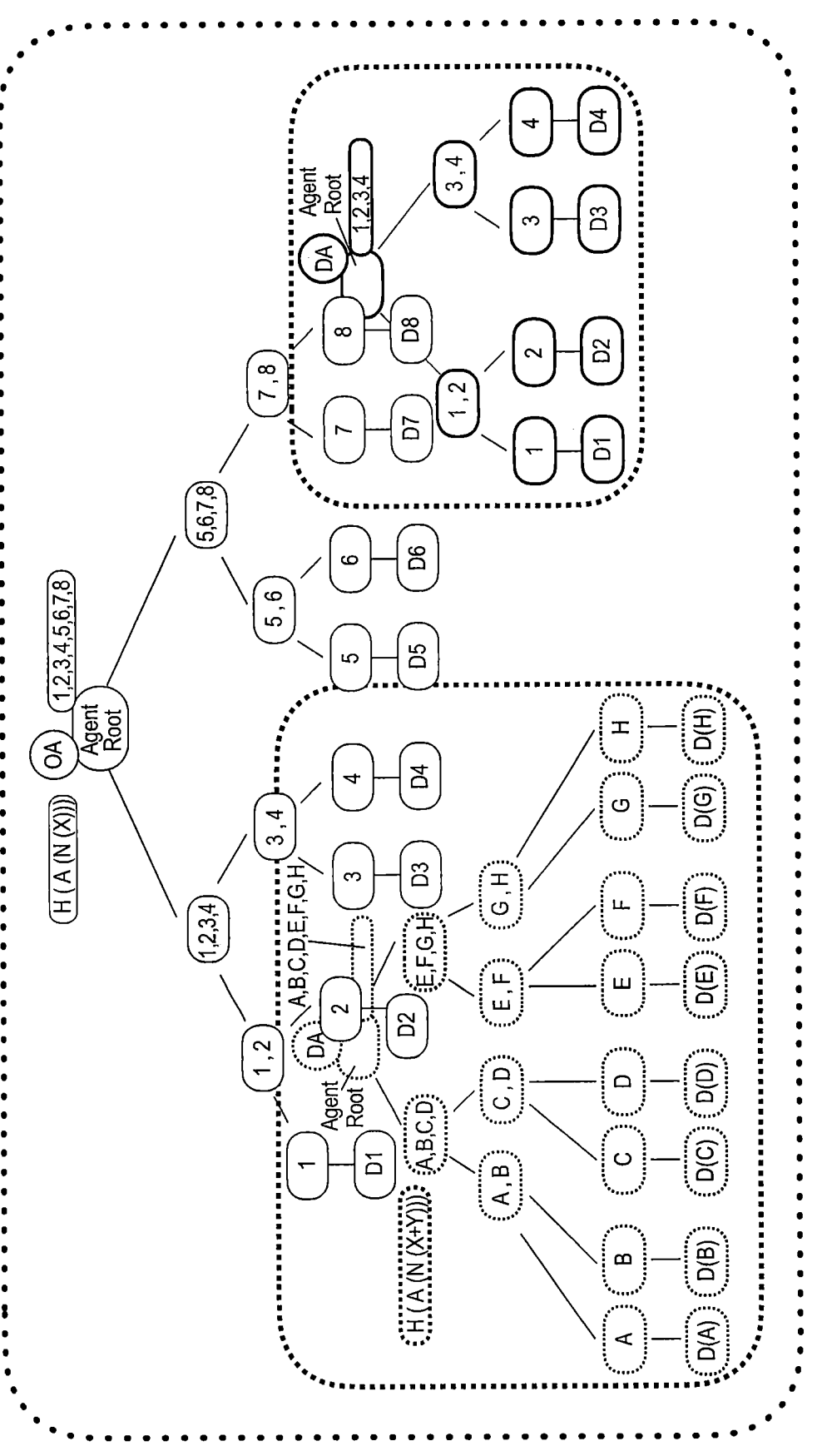
FIG. 6 is a Merkle tree representation of multiple agent creation for use therewith.

As shown in conjunction with FIG. 2, to store and access data associated with digital identities, permissions, and preferences, the system employs a combination of block and SQL storage. Block storage, such as a distributed ledger or blockchain, ensures secure and tamper-resistant storage of data related to digital identities. SQL storage allows for efficient querying and retrieval of information when required.

The system incorporates an immutability mechanism to ensure the integrity and immutability of data related to digital identities. This mechanism utilizes cryptographic techniques, such as hash functions, to generate unique identifiers (hashes) for the data. By storing these hashes and verifying them, the system can detect any tampering or unauthorized modifications to the digital identity data.

To securely combine the root hashes of multiple Merkle trees, the system employs a hash of the hash mechanism. By computing the root hash of each individual Merkle tree and then concatenating and hashing those root hashes, a new hash value is generated. This new hash represents the root of a new Merkle tree that combines the data from the original trees. This mechanism ensures the integrity and security of the combined data.

The system provides a comprehensive solution for creating and managing digital identities. It includes components such as a digital identity generator, a linkage mechanism, a permission and preference setting module, block and SQL storage, an immutability mechanism, and a hash of the hash mechanism. Together, these elements offer enhanced security, control, and efficiency in managing digital identities within the system.

The core of the present invention provides a system for creating and managing digital identities for digital agents. This system involves creating a digital identity for an individual, which will be used as a basis for creating a digital identity for the individual's digital agent. This digital identity may contain information about the individual, such as name, address, age, and other identifying information. The digital identity for the digital agent will also contain information about the agent, such as its capabilities, permissions, and preferences.

To ensure accountability and transparency, the system will allow for the identification of the creators of digital agents. This will be achieved through the use of digital certificates and digital signatures, which will be used to authenticate the creator of the agent.

The system will also provide methods for setting and removing permissions and preferences for digital agents to act on behalf of individuals. This will allow for greater control and flexibility in the use of digital agents.

As shown in conjunction with FIG. 3 through FIG. 7, a method for creating a digital identity for a digital agent incorporates the use of a Merkle tree structure to ensure security, anonymity, and privacy. A unique digital identity 200 for a user is generated representing their personal information, credentials, and attributes. A digital agent 300 may thereafter be created with its own unique digital identity. The separate digital identity created for the digital agent represents its characteristics, capabilities, and permissions. The digital identity of the user is thereby linked with the digital identity of the digital agent within a Merkle tree structure 400. Each digital identity is stored as a leaf node in the Merkle tree.

As further shown in conjunction with FIG. 7, the creation of multiple agents may be provided allowing the digital agent to act on behalf of the user, with the linkage established in the Merkle tree enabling the digital agent to assume the role of acting on behalf of the user. The digital agent may thereafter perform tasks, make decisions, and interact with various systems or entities using the authority granted by the user's digital identity.

A layer of security, anonymity, and privacy for the user's digital identity may be provided within the Merkle tree structure, providing security by utilizing cryptographic hash functions to ensure the integrity and immutability of the digital identities stored in the tree. Additionally, the Merkle tree allows for anonymity and privacy as the user's digital identity is protected within the tree, making it difficult to associate specific actions or transactions performed by the digital agent with the user's identity. Such a method leverages a Merkle tree to create and link digital identities for both the user and the digital agent. This approach provides a secure framework for the digital agent to operate on behalf of the user while preserving the user's anonymity and privacy within the system.

Using this method allows for the creation of a system for creating and managing digital identities. The system comprises several components and mechanisms that enable the generation, linking, permission setting, storage, immutability, and secure combination of digital identities using Merkle trees. The system includes a digital identity generator responsible for creating digital identities for both users and digital agents. This generator utilizes algorithms or processes to generate unique and distinguishable digital identities that represent the characteristics and attributes of the respective users and digital agents. A linkage mechanism is implemented to establish a connection between the digital identity of a user and the digital identity of a digital agent. This linkage allows for the digital agent to act on behalf of the user, leveraging the authority granted by the user's digital identity.

The root hashes are concatenated into two trees and a new has value calculated from the concatenation. The resulting has value represents the root hash of a new Merkle tree that includes all the data of each data set. The new tree can be used to verify the integrity of any piece of data that was include in either of the original trees The system allows for the setting and removal of permissions and preferences for digital agents to act on behalf of the individual.

The system consists of a block and SQL storage and access layer that ensures the immutability and security of the digital identity and digital agent. The hash of the hash is used to ensure the integrity of the data. The digital identity is linked to a digital agent that can act on behalf of the individual. The digital agent can be directed by the individual or can act autonomously. The digital identity is intertwined with the digital agent's identity to provide a layer of security, anonymity, and privacy.

The system allows for the setting and removal of permissions and preferences for digital agents to act on behalf of the individual. Permissions and preferences can be created or modified by the individual. The system can simulate a society with agents acting on behalf of entities, and emergent social dynamics can also change.

The process of connecting a digital identity with that of a digital agent involves creating a digital identity for the digital agent and linking it to the individual's digital identity. The digital agent can then act on behalf of the individual. The digital identity of the digital agent can be upgraded to become more sophisticated and autonomous while still being attached to the individual's digital identity. The multi-layered agent creation process may involve not only connecting a digital identity with that of a digital agent but also enabling the creation of additional digital agents that can act on behalf of the primary digital agent. This process begins by establishing a digital identity for the initial digital agent and linking it to the individual's digital identity. Subsequently, the digital agent assumes the role of representing and acting on behalf of the individual.

As the agent creation process evolves, the digital identity of the initial digital agent can be enhanced and upgraded to become more advanced and autonomous. This progression allows the digital agent to carry out tasks and make decisions with increasing sophistication. Importantly, throughout this process, the digital identity of the primary digital agent remains interconnected with the individual's digital identity, maintaining the association and alignment between the two. Thus, the multi-layered agent creation process encompasses the establishment of digital identities for both the primary digital agent and any subsequent digital agents created, enabling them to operate on behalf of the individual while maintaining the hierarchical relationship between their digital identities.

The system allows for the digital agent to act as an agent, a guardian, and even to file paperwork on behalf of the individual. The system can apply security measures such as digital certificates, digital signatures, and private and public keys to ensure the security of the digital identity and digital agent. The system uses Merkle trees to ensure the immutability and security of the digital identity and digital agent. The root hash of two or more (N) degrees separate Merkle trees can be computed by first calculating the root hash of each tree separately. Once the root hashes of each tree are obtained, they can be concatenated together (in any order) to compute a new hash value from the concatenation. This new hash value represents the root of a new Merkle tree that includes the data from both of the original trees.

In addition to the existing functionalities, the system may incorporates the use of Trust and Confidence Scoring to provide an extra layer of accountability, certification, and validation for the digital agent. Trust and Confidence Scoring mechanisms may be implemented to assess and evaluate the reliability, integrity, and trustworthiness of the digital agent's actions and behavior. These mechanisms may analyze various factors such as historical performance, track record, user feedback, and verifiable credentials to generate a trust score that reflects the agent's reliability.

Furthermore, the system may employ security measures, such as digital certificates, digital signatures, and private and public keys, to ensure the robust security of both the digital identity and the digital agent. These measures help in verifying the authenticity and integrity of the digital identities involved, preventing unauthorized access or tampering.

To ensure the immutability and security of the digital identity and digital agent, the system utilizes Merkle trees. By employing Merkle trees, the system creates a hierarchical structure that guarantees data integrity and enables efficient verification. The root hash of separate Merkle trees, computed by calculating the root hash of each tree individually, can be concatenated in any order. This concatenation process results in a new hash value that represents the root of a new Merkle tree incorporating the data from both original trees. This approach ensures the integrity and security of the combined data from the digital identity and digital agent.

In summary, the system not only enables the digital agent to act as an agent, guardian, and file paperwork on behalf of the individual, but it also incorporates Trust and Confidence Scoring for accountability and validation purposes. Additionally, it utilizes security measures like digital certificates and digital signatures, while employing Merkle trees to ensure the immutability and security of the digital identity and digital agent.

2. Operation of the Preferred Embodiment

In operation, the present invention provides a system for creating and managing digital identities and digital agents that can act on behalf of an individual. The system uses blockchain technology and Merkle trees to ensure the immutability and security of the digital identity and digital agent. The system allows for the setting and removal of permissions and preferences for digital agents to act on behalf of the individual. The system can simulate a society with agents acting on behalf of entities, and emergent social dynamics can also change.

A unique digital agent is thereby created designed to act on behalf of a user. The digital agent possesses a unique digital identity that is directly linked to the digital identity of the user it represents. This linkage ensures a clear association between the user and the digital agent, enabling the agent to act on behalf of the user with the necessary authority and permissions. The digital agent incorporates an AI and ML-based learning system, enabling it to learn and improve over time through interactions with the user. This system leverages artificial intelligence and machine learning algorithms to analyze user preferences, behaviors, and patterns. With each interaction, the digital agent grows and expands its capabilities, adapting to better serve the user's needs.

To efficiently handle various tasks, the digital agent includes a task assignment module. This module is responsible for assigning tasks to the digital agent based on user requirements and preferences. The agent can autonomously process and execute these tasks, relieving the user of manual effort and streamlining task management.

The digital agent is equipped with a file management module that allows it to handle paperwork and other documents on behalf of the user. This module provides the agent with the capability to organize, file, and manage documents in a secure and efficient manner. By automating these tasks, the agent assists the user in document-related activities.

To ensure the confidentiality and integrity of user and agent data, the digital agent incorporates a security module. This module employs robust security measures, including encryption, access controls, and data protection protocols, to safeguard sensitive information. By implementing stringent security mechanisms, the digital agent maintains the privacy and security of user-related data.

The digital agent features an emergent social dynamics mechanism that facilitates interactions with other digital agents. This mechanism allows the digital agent to engage in collaborative activities, exchange information, and potentially create new social dynamics within the digital ecosystem. By participating in social interactions, the digital agent can enhance its capabilities and foster collaborative decision-making.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching.

The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company,* v. *Hilton Davis Chemical,* 520 US 17 (1997) or *Festo Corp.* v. *Shoketsu Kinzoku Kogyo Kabushiki Co.,* 535 U.S. 722 (2002), or other similar caselaw or subsequent precedent should not be made if any future claims are added or amended subsequent to this Patent Application.

We claim:

1. A method for creating a digital identity for a digital agent, comprising:

generating a digital identity for a user;

creating a digital agent with its own unique digital identity;

linking the digital identity of the user with the digital identity of the digital agent;

allowing the digital agent to act on behalf of the user;

providing security, anonymity, and privacy for the user's digital identity using Merkle trees and blockchain technology; and storing the digital identities of the user and the digital agent in a Merkle tree structure, wherein each digital identity is stored as a leaf node in the Merkle tree.

2. The method of claim 1, wherein linking the digital identity of the user with the digital identity of the digital agent comprises establishing a cryptographic connection between the digital identities to enable validation and verification of the linkage using hash-based cryptographic proofs.

3. The method of claim 1, further comprising:

Implementing a permission and preference setting module that enables the user to define an modify permissions and preferences for the digital agent acting on their behalf.

4. The method of claim 1, wherein providing security, anonymity, and privacy comprises:

utilizing cryptographic hash functions to ensure the integrity and immutability of the digital identities; and protecting the user's digital identity within a Merkle tree structure.

5. The method of claim 1, wherein the digital agent provides anonymized data during interactions with external services, using tiered-encryption techniques to protect the user's privacy.

* * * * *